(12) United States Patent
Chong, Jr.

(10) Patent No.: US 6,697,867 B1
(45) Date of Patent: Feb. 24, 2004

(54) SYSTEM AND METHOD FOR ACCESSING MULTIPLE GROUPS OF PERIPHERAL DEVICES

(75) Inventor: Fay Chong, Jr., Cupertino, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 710 days.

(21) Appl. No.: 09/625,170

(22) Filed: Jul. 25, 2000

(51) Int. Cl.$^7$ ............................................. G06F 15/16
(52) U.S. Cl. ....................... 709/229; 709/227; 709/228; 710/2; 710/20; 710/21
(58) Field of Search ................................ 709/227, 228, 709/229; 710/2, 20, 21

(56) References Cited

U.S. PATENT DOCUMENTS

| | | | | |
|---|---|---|---|---|
| 4,059,729 A | * | 11/1977 | Eddy et al. ................... | 370/249 |
| 5,058,004 A | | 10/1991 | Ravid ............................ | 710/2 |
| 5,097,439 A | | 3/1992 | Patriquin et al. .............. | 711/2 |
| 5,239,445 A | | 8/1993 | Parks et al. ................... | 361/686 |
| 5,590,375 A | | 12/1996 | Sangveraphunsiri et al. .. | 710/21 |
| 5,740,397 A | | 4/1998 | Levy ............................ | 711/114 |
| 5,894,560 A | | 4/1999 | Carmichael et al. .......... | 710/25 |
| 5,964,848 A | | 10/1999 | Kikinis et al. ................. | 710/2 |
| 6,073,220 A | | 6/2000 | Gunderson ................... | 711/162 |
| 6,275,879 B1 | * | 8/2001 | Goodfellow .................. | 710/74 |
| 6,356,998 B2 | | 3/2002 | Roche .......................... | 712/244 |
| 6,446,148 B1 | * | 9/2002 | Goodfellow .................. | 710/2 |
| 6,513,091 B1 | | 1/2003 | Blackmon et al. | |

OTHER PUBLICATIONS http://www.it.bton.ac.uk/burks/burks/pcinfo/hardware/atafaq/atafq2.html, "Intruction/Hardware," Mar. 24, 2000, 10 pages.

Western Digital, "Enhanced IDE Interface (EIDE)," http://www.wdc.com/products/drives/drivers-ed/eide.html, Oct. 7, 1998, 3 pages.

Intel, "IDE Controller Functional Description," 2000 Intel Corporation, 10 pages.

Intel, "IDE Controller Register Descriptions (PCI Function 1)," 2000 Intel Corporation, 13 pages.

(List continued on next page.)

Primary Examiner—Nabil El-Hady
(74) Attorney, Agent, or Firm—Robert C. Kowert; Meyertons, Hood, Kivlin, Kowert & Goetzel, P.C.

(57) ABSTRACT

Several systems and methods are described for accessing one of multiple groups of peripheral devices. One of the systems includes a host system, multiple peripheral devices, and a host adapter. The peripheral devices are arranged to form multiple groups, each group including at least one peripheral device. The host system is coupled to the peripheral devices via the host adapter, and accesses the peripheral devices via the host adapter. The peripheral devices of each group receive a group access signal for controlling accesses from the host system. The host adapter includes a control register and signal routing logic. The signal routing logic is coupled to the control register and to each of the groups of peripheral devices. The control register stores a value for selecting one of the groups of peripheral devices. The host system may include a central processing unit (CPU) configured to write the value to the control register. The signal routing logic receives an access signal from the host system and routes the access signal to the group access signal for the group of peripheral devices selected by the value stored in the control register. The group access signal for each of the remaining groups of peripheral devices is deasserted so that the groups of peripheral devices not selected by the value stored in the control register are not accessed (i.e., do not respond to accesses from the host system).

18 Claims, 4 Drawing Sheets

OTHER PUBLICATIONS

"Intelligent Disk Drive," Conner Peripherals, Product Manual, Revision 1, Oct. 1990, 9 pages.

Alex T. Ivopol, "IDE–Hardware Reference & Information Document," Jan. 19, 1994, 17 pages.

Promise Technology, Inc., About Promise; White Papers, "A Promising Future: Setting The Trends in IDE," http://www.promise.com/Docs/Papers/trendsetting.html, Jul. 31, 2000, 6 pages.

Promise Technology, Inc., About Promise; White Papers, "Take Your Drives Beyond Ultra Levels of Performance with IDE RAID," http://www.promise.com/Docs/Papers/aboutideraid.html, Jul. 31, 2000, 9 pages.

Promise Technology, Inc., "PCI Card for Ultra ATA/66 Drives; Ultra 66," 1998, 2 pages.

ARCO Computer Products, Inc., User's Manual, "DupliDisk PCI," 1998, 16 pages.

RAIDZONE Technology, "RAIDZONE Technology Overview," 1999 Consensys Corp., 4 pages.

RAIDZONE Technology, "RAIDZONE Frequently Asked Questions," 1999 Consensys Corp., 2 pages.

Winn L. Rosch Hardware Bible, Electronic Edition, "Chapter 9: Storage Interfaces," 1997, 36 pages.

Peter McLean, Information Technology–AT Attachement–3 Interface (ATA–3), Revision 6, Oct. 26, 1995, pp. 1–41 and 120–148.

* cited by examiner

SYSTEM AND METHOD FOR ACCESSING MULTIPLE GROUPS OF PERIPHERAL DEVICES

BACKGROUND OF THE INVENTION

1. Field of the Invention

This invention relates to computer systems, and more particularly to computer systems including interfaces for coupling to peripheral devices.

2. Description of the Related Art

Intelligent/Integrated drive electronics (IDE) is an interface technology for peripheral devices (e.g., disk drives) wherein the controller is integrated into the drive. AT attachment (ATA) is peripheral device interface standard which implements IDE. As a result, the two terms and their acronyms are often used interchangeably. Several versions of the ATA standard exist, including the basic ATA standard, ATA-2, ATA-3, and ATA-4. In addition, some organizations may refer to variations of the ATA standards by other names, including "Fast ATA," "Fast ATA-2, " and "Ultra ATA." As used herein, the term "AT Attachment" and the acronym "ATA" refer to all variants of ATA and other interface standards implementing IDE.

The basic ATA standard (ANSI X3.221-1994) supports a single 16-bit parallel data channel which may be shared by two separate devices configured as master and slave. A typical personal computer includes two ATA interfaces (i.e., two ATA host adapters, which may integrated in a single chip) each providing a separate ATA data channel. Thus the typical personal computer is adapted for coupling to up to four different ATA devices.

Many different types of ATA devices are now available, including hard disk drives, CD-ROM drives, CD-R/W drives, and DVD drives. It is believed that with time more and more computer users will seek the ability to connect more than four ATA devices to a personal computer via ATA host adapter ports.

An existing solution for expanding ATA connectivity of a computer system is to add more ATA host adapters to the system (e.g., via plug in I/O cards). However, such added ATA host adapters are typically coupled to a single bus of the computer system (e.g., a peripheral component interface or PCI bus). Adding multiple ATA host adapters in this manner is typically not only costly, the multiple ATA host adapters can also significantly increase communication traffic on the bus to which they are coupled, consequently reducing system performance.

In addition, small computer system interface (SCSI) adapters and devices are readily available, and multiple SCSI storage devices can typically be coupled to a computer system via a single SCSI bus and adapter. However, SCSI components are typically more expensive than similar ATA components, and can be difficult to instill. For example, to add SCSI connectivity to a computer system, a SCSI adapter often must be installed in the system (e.g., via a plug in I/O card), and the associated driver software must be installed and configured.

It would thus be desirable to have a peripheral device interface (e.g., a host adapter) which may be configured to comply with an ATA standard. The host adapter would form an interface between a host system (e.g., a personal computer) and multiple ATA devices. The desired host adapter would allow more than two standard ATA devices to be coupled to the same ATA channel. Included in a personal computer, the desired host adapter would thus increase the ATA connection capabilities of the personal computer, allowing more than four relatively inexpensive standard ATA devices to be coupled to the personal computer.

SUMMARY OF THE INVENTION

Embodiments are described for accessing a group of peripheral devices, wherein the group of peripheral devices is one of multiple groups of peripheral devices. One of the embodiments includes a host system, multiple peripheral devices, and a host adapter. The peripheral devices are arranged to form multiple groups, each group including at least one peripheral device. The host system is coupled to the peripheral devices via the host adapter, and accesses the peripheral devices via the host adapter. The peripheral devices of each group receive a group access signal for controlling accesses from the host system, and each group of peripheral devices receives a different group access signal.

The host adapter includes a control register and signal routing logic. The signal routing logic is coupled to the control register and to each of the groups of peripheral devices. The control register stores a value for selecting one of the groups of peripheral devices. The host system may include a central processing unit (CPU) configured to write the value to the control register. The signal routing logic receives an access signal from the host system and routes the access signal to the group access signal for the group of peripheral devices selected by the value stored in the control register. The group access signal for each of the remaining groups of peripheral devices is deasserted so that the groups of peripheral devices not selected by the value stored in the control register are not accessed (i.e., do not respond to accesses from the host system).

Each of the peripheral devices may be a standard AT Attachment (ATA) device. In this case, the access signal may be, for example, an ATA chip select signal (e.g., the chip select 0 signal (CS0), or the chip select 1 signal (CS1)) or control signal (e.g., the data input/output read signal DIOR, or the data input/output write signal DIOW). Each of the peripheral devices may include multiple registers, and the group access signal may be used to select a portion of the registers of the peripheral devices of the selected group (e.g., a command register block or a control register block). The group access signal may be asserted in order to select the portion of the registers.

All of the peripheral devices may receive a common set of signals excluding the group access signals. For example, the peripheral devices of each group may be connected to a common data bus, and may receive the same data signals. The common data bus may be, for example, an ATA data bus.

The peripheral devices may be arranged to form, for example, p groups. The signal routing logic may include a 1-to-p demultiplexer coupled to the control register and configured to route the access signal from the host system to the selected group dependent upon the value stored in the control register.

In an ATA embodiment of the host adapter, the peripheral devices are standard ATA devices (e.g., ATA hard disk drives, ATA CD-ROM drives, ATA tape drives, or ATA DVD drives), and the host adapter may be an ATA host adapter that includes a control register and routing logic as discussed above. Each group of ATA devices is configured to receive an ATA chip select 0 (CS0) signal and an ATA chip select 1 (CS1) signal for controlling accesses from the host system to the ATA devices according to an ATA standard. A group of ATA devices may be a master/slave pair or a single device. The ATA host adapter includes the control register and signal routing logic described above. The control register stores a value for selecting one of the groups of ATA devices. The signal routing logic provides the CS0 and CS1 signals to the group of ATA devices selected by the value stored in the control register. The CS0 and CS1 signals for each of the remaining groups of ATA devices are deasserted so that the groups of ATA devices not selected by the value stored in the control register do not respond to accesses from the host system.

Each of the ATA devices includes multiple registers partitioned to form a control portion and a command portion. The CS0 signal is asserted in order to select the command portion, and the CS1 signal is asserted in order to select the control portion.

All of the ATA devices may receive common ATA signals excluding the CS0 and CS1 signals. For example, all of the ATA devices may be connected to a common ATA bus used to convey common ATA signals excluding the CS0 and CS1 signals.

The ATA devices may be arranged to form p groups, and the signal routing logic may include two 1-to-p demultiplexers. A first 1-to-p demultiplexer may be coupled to the control register and configured to route the CS0 signal to the ATA devices of the group selected by the value stored in the control register. The second 1-to-p demultiplexer may be coupled to the control register and configured to route the CS1 signal to the ATA devices of the group selected by the value stored in the control register.

One embodiment of a method for accessing a group of peripheral devices is described, wherein the group of peripheral devices is one of multiple groups of peripheral devices, and wherein each group of peripheral devices includes at least one peripheral device. Each group of peripheral devices receives a different group access signal for controlling access to the peripheral devices of the group. The method includes selecting the group of peripheral devices from among the multiple groups of peripheral devices. The selecting may include, for example, storing a value in a control register, wherein the value stored in the control register selects the group of peripheral devices from among the multiple groups of peripheral devices. The method also includes asserting an access signal, and routing the access signal to the groups of peripheral devices such that: (i) the asserted access signal is provided as the group access signal for the selected group of peripheral devices, and (ii) the group access signal received by the remaining groups of peripheral devices is deasserted. The routing may include, for example, routing the access signal to the group of peripheral devices selected by the value stored in the control register.

One embodiment of a method for accessing a group of ATA devices is described, wherein the group of ATA devices is one of multiple groups of ATA devices. The method includes storing a value in a control register for selecting the group of ATA devices from among the multiple groups of ATA devices. An ATA standard chip select 0 (CS0) signal and an ATA standard chip select 1 (CS1) signal are generated such that either the CS0 signal or the CS1 signal is asserted. The generated CS0 and CS1 signals are routed to the ATA devices dependent upon the value stored in the control register such that the generated CS0 and CS1 signals are provided to the ATA devices of the group selected by the value. The ATA devices of groups not selected by said value receive deasserted CS0 and CS1 signals such that the ATA devices of the non-selected groups do not respond to ATA accesses.

Figure 1:
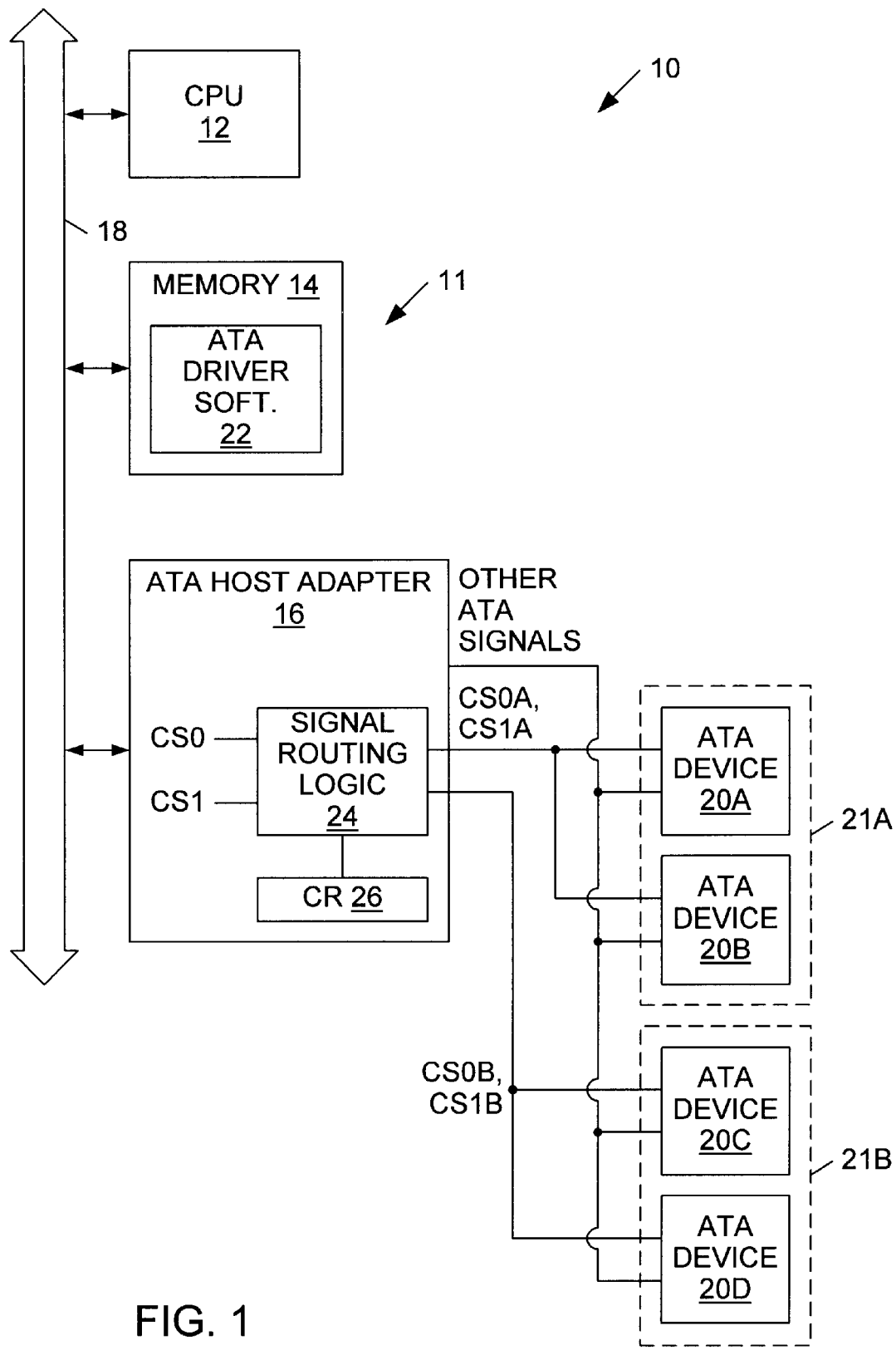
FIG. 1 is a diagram of one embodiment of a computer system including a host system, multiple ATA devices, and an ATA host adapter coupled between the host system and the ATA devices, wherein the ATA host adapter includes signal routing logic for routing ATA chip select signals to the ATA devices and a control register for controlling the signal routing logic.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS OF THE INVENTION

A typical AT Attachment (ATA) device includes multiple registers partitioned to form a command block and a control block. The ATA device is accessed via the registers, and controlled by loading values into registers of the control block. The ATA device includes an ATA interface receiving standard ATA channel interface signals. The standard ATA channel interface signals may be divided into three groups: (1) data signals (e.g. 16 bits), (2) register selection signals, and (3) control signals. The register selection signals include a chip select 0 (CS0) signal, a chip select 1 (CS1) signal, and three drive address signals DA0, DA1, and DA2. The CS0 and CS1 signals are used to select between the command block and the control block. When the CS0 signal is asserted, the command block is selected. On the other hand, when the CS1 signal is asserted, the control block is selected. The drive address signals DA0, DA1, and DA2 are used to select a particular register within the selected block. The standard ATA control signals include a data input/output read (DIOR) signal and a data input/output write (DIOW) signal.

As described above, a conventional ATA channel may be shared by at most two ATA devices configured as master and slave. A drive/head register of the command block has a "master/slave select" bit 4 for selecting either the master drive or the slave drive.

In an ATA embodiment of a computer system described below, a number of ATA devices may be arranged to form multiple master/slave device pairs accessed on a single channel. All of the ATA devices receive the same standard ATA channel interface signals minus the CS0 and CS1 signals. The computer system includes signal routing logic used to selectively route the CS0 and CS1 signals to a given one of multiple master/slave device pairs. In order to access a specific ATA device, the signal routing logic is first configured to route the CS0 and CS1 signals to the specific ATA device (e.g., to the master/slave device pair including the specific ATA device). The specific ATA device is then accessed using the routed CS0 and CS1 signals. The signal routing logic and access method allow the number of ATA devices connected to the same ATA channel to be increased above the current limit of two ATA devices. In some embodiments, the routing logic or similar logic may selectively route other ATA signals in addition to CS0 and CS1.

FIG. 1 is a diagram of one embodiment of a computer system 10 including a host system 11, multiple ATA devices 20A–20D, and an ATA host adapter 16 coupled between host system 11 and ATA devices 20A–20D. Host system 11 includes a central processing unit (CPU) 12, a memory 14, and a bus 18. CPU 12, memory 14, and ATA host adapter 16 are coupled to bus 18.

It is noted that modern computer systems typically have multiple buses coupled to one another via bridge logic. Bus 18 may thus represent multiple buses or a hierarchy of buses of a modern computer system wherein the buses are coupled to one another.

In the embodiment of FIG. 1, ATA devices 20A and 20B are configured to form a first "master/slave" device pair 21A according to an ATA standard. One of the ATA devices 20A and 20B is configured to be a "master" device, and the other is configured to be a "slave" device. Similarly, ATA devices 20C and 20D are configured to form a second master/slave device pair 21B according to the ATA standard. One of the ATA devices 20C and 20D is configured to be a master device, and the other is configured to be a slave device. Thus ATA devices 20A–20D are arranged to form two different master/slave device pairs 21 according to the ATA standard.

It is noted that all four ATA devices 20A–20D are connect to the same ATA channel. All four ATA devices 20A–20D are coupled to the same signal lines conveying ATA defined signals, except for the ATA standard CS0 and CS1 signals, as indicated in FIG. 1. For example, all four ATA devices 20A–20D receive the same ATA defined control signals, register selection drive address signals DA0–DA2, and data signals.

ATA devices 20A–20D are configured to receive ATA standard chip select signals CS0 and CS1. ATA devices 20A and 20B, members of first master/slave device pair 21A, receive CS0A and CS1A signals as their respective ATA standard chip select signals. ATA devices 20C and 20D, members of second master/slave device pair 21B, receive CS0B and CS1B signals as their respective ATA standard chip select signals. As will be described below, ATA host adapter 16 is used to selectively route the ATA standard CS0 and CS1 signals to either ATA devices 20A and 20B of first master/slave device pair 21A (i.e., as respective CS0A and CS1A signals) or to ATA devices 20C and 20D of second master/slave device pair 21B (i.e., as respective CS0B and CS1B signals).

ATA devices 20 may be, for example, data storage devices (e.g., hard disk drives, CD-ROM drives, tape drives, DVD drives, etc.) including ATA interfaces. Computer system 12 also includes ATA driver software 22 stored within memory 14. CPU 12 accesses ATA devices 20 via ATA host adapter 16 by executing instructions of ATA driver software 22. For example, CPU 12 may store data in, or retrieve data from, a selected ATA device 20 via ATA host adapter 16 by executing instructions of ATA driver software 22.

In the embodiment of FIG. 1, ATA host adapter 16 includes signal routing logic 24 coupled to a control register (CR) 26. Signal routing logic 24 receives ATA standard chip select signals CS0 and CS1 produced by logic within ATA host adapter 16, and produces chip select signals CS0A, CS0B, CS1A, and CS1B dependent upon the contents of control register 26. ATA devices 20A and 20B of first master/slave device pair 21A receive chip select signals CS0A and CS1A, and ATA devices 20C and 20D of second master/slave device pair 21B receive chip select signals CS0B and CS1B.

Signal routing logic 24 produces signals CS0A and CS1A, or signals CS0B and CS1B, with the same logic values as respective signals CS0 and CS1 signals dependent upon the contents of control register 26. For example, when control register 26 contains a first value, signal routing logic 24 produces signals CS0A and CS1A having the same logical values as the respective signals CS0 and CS1. In this case, ATA devices 20A and 20B, receiving chip select signals CS0A and CS1A, are "selected". The signals CS0 and CS1, which signal routing logic 24 produces as signals CS0A and CS1A respectively, may be used to access the registers of ATA device 20A or 20B. Thus ATA devices 20A and 20B may be accessed when control register 26 contains the first value and signal routing logic 24 produces signals CS0 and CS1 as signals CS0A and CS1A respectively. At the same time, chip select signals CS0B and CS1B may be deasserted, and ATA devices 20C and 20D, both receiving the deasserted signals CS0B and CS1B, may be "unselected".

When control register 26 contains a second value, signal routing logic 24 produces signals CS0B and CS1B having the same logical values as the respective signals CS0 and CS1. In this case, ATA devices 20C and 20D, receiving chip select signals CS0B and CS1B , are "selected". The signals CS0 and CS1, which signal routing logic 24 produces as the signals CS0B and CS1B respectively, may be used to access the registers of ATA device 20C or 20D. Thus ATA devices 20C and 20D may be accessed when control register 26 contains the second value and signal routing logic 24 produces signals CS0 and CS1 as respective signals CS0B and CS1B. At the same time, chip select signals CS0A and CS1A may be deasserted, and ATA devices 20A and 20B, both receiving the deasserted signals CS0A and CS1A, may be "unselected".

Chip select signals CS0 and CS1 received by unselected ATA devices may be deasserted by pullup/pulldown elements (e.g., resistors, transistors, etc.) within ATA host adapter 16, within the unselected ATA devices, or coupled to signal lines used to convey the CS0 and CS1 signals from ATA host adapter 16 to the ATA devices. Thus ATA host adapter 16 may provide the deasserted CS0 and CS1 signals to the unselected ATA devices, or the CS0 and CS1 signals received by the unselected ATA devices may be deasserted by other means.

As an example of accessing a particular device, in order to access ATA device 20C, the second value may be stored in control register 26. In response to the second value, signal routing logic 24 produces signals CS0B and CS1B having the same logical values as respective signals CS0 and CS1. ATA devices 20C and 20D are thus selected, and other signals (e.g., the master/slave select bit 4 of the drive/head command block register) may be used to select ATA device 20C from the master/slave pair including ATA devices 20C and 20D. At the same time, chip select signals CS0A and CS1A received by unselected ATA devices 20A and 20B are deasserted.

In other embodiments of computer system 10, all four ATA devices 20A–20D may be configured as master ATA devices. In this case, ATA host adapter 16 provides different sets of ATA chip select signals to each ATA device 20. For example, ATA hoist adapter 16 may provide chip select signals CS0A and CS1A to ATA device 20A, chip select signals CS0B and CS1B to ATA device 20B, chip select signals CS0C and CS1C to ATA device 20C, and chip select signals CS0D and CS1D to ATA device 20D. Still other embodiments of computer system 10 may include more than four ATA devices, and may include more than two master/slave device pairs.

The ATA embodiment described above is an exemplary embodiment. In other embodiments, the devices may be other types of peripheral devices besides ATA. The devices may be arranged in groups, wherein each group includes one or more peripheral devices. Each group receives at least one group access signal for controlling host access to the group. The host adapter for interfacing the host system to the groups of peripheral devices may include a control register for storing a value for selecting one of the groups of peripheral devices. The host adapter may also include routing logic for routing one or more host access signals to the one or more group access signals for the selected group. The peripheral devices may share common data signals and other control signals. Non-shared group access signals for non-selected groups are de-asserted so that peripheral devices from the non-selected groups do not respond to host accesses.

Figure 2:
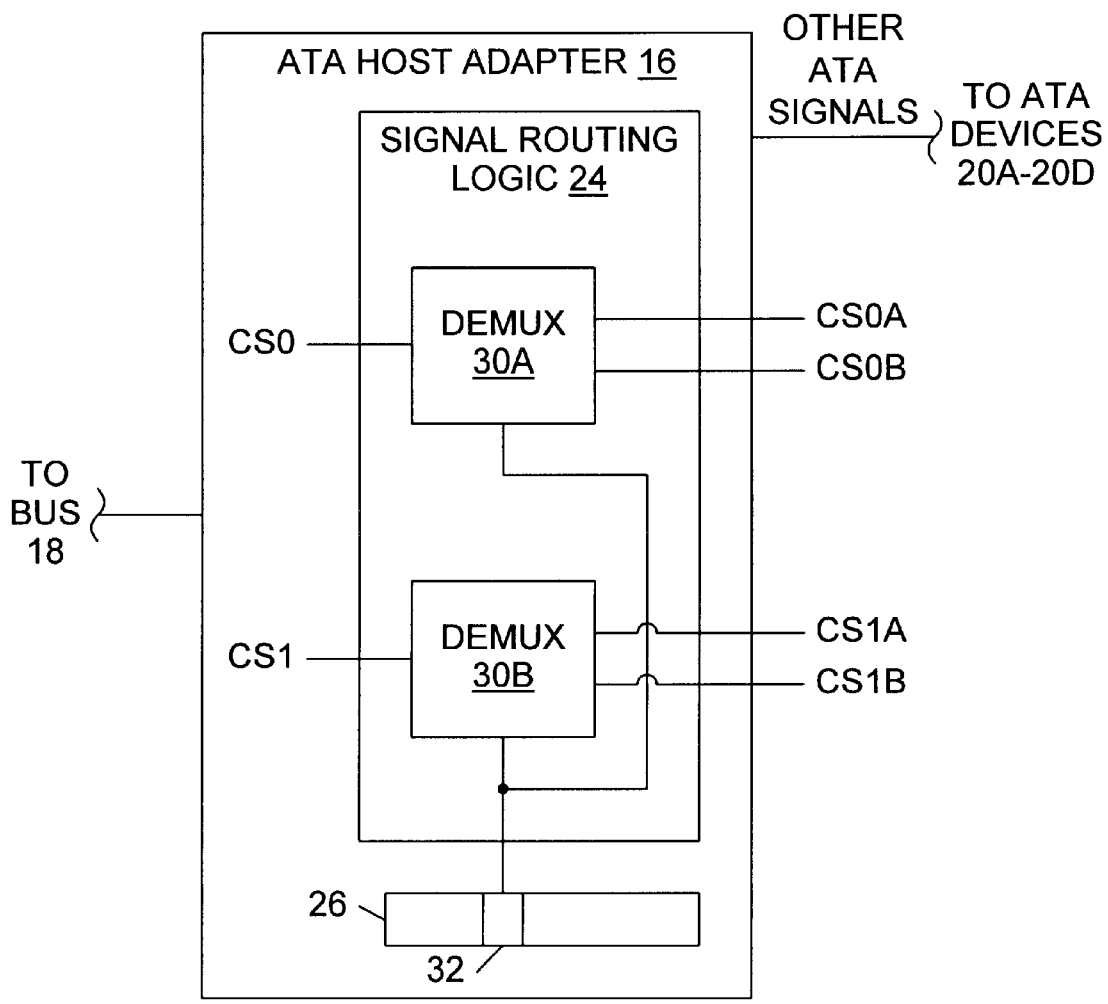
FIG. 2 is a diagram of one embodiment of the ATA host adapter of FIG. 1, wherein the signal routing logic includes two demultiplexers coupled to the control register.

FIG. 2 is a diagram of one embodiment of ATA host adapter 16 of FIG. 1. In the embodiment of FIG. 2, signal routing logic 24 of ATA host adapter 16 includes a first demultiplexer (DEMUX) 30A and a second DEMUX 30B coupled to control register 26. Control register 26 includes a bit 32 used to select between the two master/slave device pairs. DEMUX 30A receives chip select signal CS0 and produces signal CS0A or signals CS0B with the same logic value as signal CS0 dependent upon the value of bit 32. Similarly, DEMUX 30B receives chip select signal CS1 and produces signal CS1A or signals CS1B with the same logic value as signal CS1 dependent upon the value of bit 32.

For example, if the value of bit 32 is a '0', DEMUX 30A may produce signal CS0A with the same logic value as signal CS0, and DEMUX 30B may produce signal CS1A with the same logic value as signal CS1. In this case, ATA devices 20A and 20B receiving signals CS0A and CS1A may be "selected", and ATA device 20A and/or ATA device 20B may be accessed. At the same time, chip select signals CS0B and CS1B may be deasserted, and ATA devices 20C and 20D receiving the deasserted signals CS0B and CS1B may be "unselected".

If the value of bit 32 is a '1', DEMUX 30A may produce signal CS0B with the same logic value as signal CS0, and DEMUX 30B may produce signal CS1B with the same logic value as signal CS1. In this case, ATA devices 20C and 20D receiving signals CS0B and CS1B may be "selected", and ATA device 20C and/or ATA device 20D may be accessed. At the same time, chip select signals CS0A and CS1A may be deasserted, and ATA devices 20A and 20B receiving the deasserted signals CS0A and CS1A may be "unselected".

Table 1 below is a truth table for the above described exemplary embodiment of signal routing logic 24 of FIG. 2.

TABLE 1

Truth Table For An Exemplary Embodiment
Of Signal Routing Logic 24 of FIG. 2

| BIT 32 | CS0A | CS0B | CS1A | CS1B |
|---|---|---|---|---|
| 0 | CS0 | (deasserted) | CS1 | (deasserted) |
| 1 | (deasserted) | CS0 | (deasserted) | CS1 |

Referring to FIGS. 1 and 2, control register 26 of ATA host adapter 16 is an addressable register having an address within an address space assigned to ATA host adapter 16. ATA driver software 22 includes instructions which write values to control register 26. In order to access a given ATA drive 20, CPU 12 executes one or more instructions of ATA driver software 22 which causes CPU 12 to write a value to control register 26. The value of bit 32 of control register 26 causes signal routing logic 24 to route the CS0 and CS1 signals to the given ATA drive 20. For example, in order to access ATA drive 20A, CPU 12 executes one or more instructions of ATA driver software 22 which causes CPU 12 to write a '0' to bit 32 of control register 26. The '0' in bit 32 of control register 26 causes signal routing logic 24 to route the CS0 and CS1 signals to ATA drives 20A and 20B as respective signals CS0A and CS1A. CPU 12 may then execute instructions of ATA driver software 22 which result in the access of ATA device 20A.

It is noted that where control register 26 includes n bits, signal routing logic 24 may be configured to route signals CS0 and CS1 to up to $2^n$ different master/slave device pairs, or up to $2^n$ different devices configured as ATA master devices. Alternatively, each bit of the control register may be mapped to a device pair, so that an n bit control register would allow for selection of n different device pairs(or groups) on a single channel.

Figure 3:
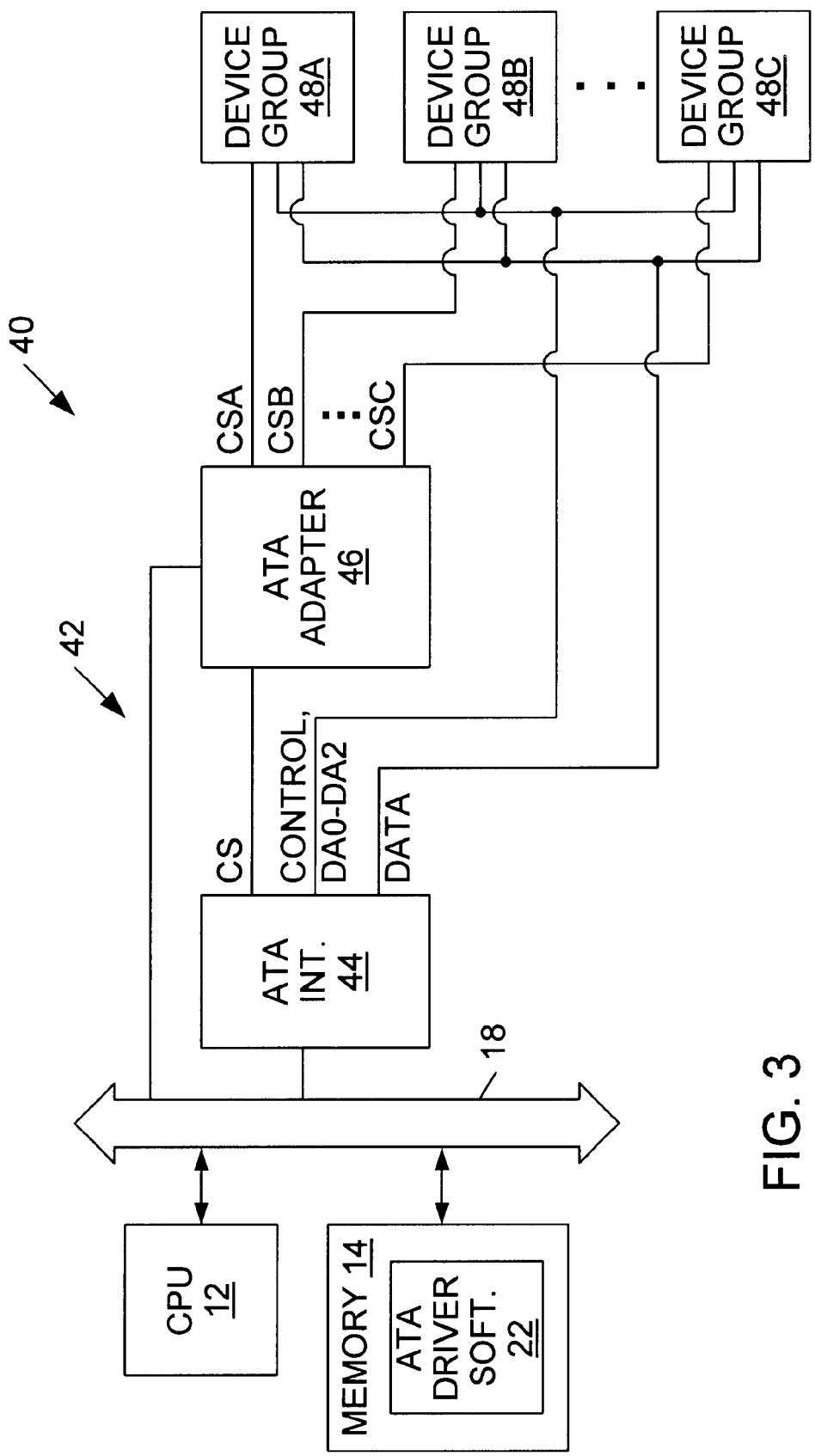
FIG. 3 is a diagram of one embodiment of a computer system including a host system, multiple groups of ATA devices, and an ATA adapter coupled between the host system and the ATA device groups, wherein the host system includes an ATA interface, and wherein the ATA adapter routes ATA chip select signals, produced by the ATA interface, to the ATA device groups.

FIG. 3 is a diagram of one embodiment of a computer system 40 including a host system 42, multiple ATA device groups 48A–48C, and an ATA adapter 46 coupled between host system 42 and ATA device groups 48A–48C. Each ATA device group 48 includes at least one ATA device (e.g., an ATA data storage device) including an ATA interface. Components of computer system 40 shown in FIG. 1 and described above are labeled similarly in FIG. 3. Host system 42 includes CPU 12, memory 14, and an ATA interface 44 coupled to bus 18. ATA interface 44 is adapted for coupling to ATA devices, and functions according to an ATA standard. ATA interface 44 may be, for example, a typical ATA interface provided with a modern computer system.

ATA interface 44 produces ATA standard chip select (CS) signals CS0 and CS1. ATA interface 44 also produces ATA standard control signals, ATA standard register selection drive address signals DA0–DA2, and ATA standard data signals. ATA adapter 46 is coupled to bus 18, and receives the CS0 and CS1 signals produced by ATA interface 44. ATA adapter 46 is adapted for coupling to ATA devices (i.e., the same ATA devices as ATA interface 44). In the embodiment of FIG. 3, CPU 12 accesses the ATA devices of ATA device groups 48 via ATA interface 44 and ATA adapter 46 by executing instructions of ATA driver software 22 within memory 14.

In one embodiment, all ATA devices of ATA device groups 48 are coupled to the same ATA defined control signals, register selection signals DA0–DA2, and data signals as indicated in FIG. 3. All ATA devices of ATA device groups 48 are thus coupled to the same ATA channel. ATA adapter 46 is used to selectively route the CS0 and CS1 signals, produced by ATA interface 44, to either ATA device group 48A as CSA signals, or ATA device group 20B as CSB signals, or ATA device group 20C as CSC signals.

In other embodiments, all ATA devices of device groups 48 may still be coupled to one ATA channel; however, in addition to CS0 and CS1 other ATA signals may be selectively routed by adapter 46. For example, a separate ATA defined I/O Ready (IOREADY) signal may be received from each device group and multiplexed by adapter 46 into one I/O Ready signal for ATA interface 44. In one embodiment, the same control register used to control the CS0 and CS1 demultiplexer may be used to control a multiplexer or demultiplexer for other ATA signals.

In order to access a selected ATA device, ATA adapter 46 routes the CS0 and CS1 signals to the ATA devices of the ATA device group 48 including the selected ATA device. For example, ATA adapter 46 may include signal routing logic 24 and control register 26 of FIG. 1. In this case and in order to access a selected ATA device within ATA device group 48B, a value is stored within control register 26 which causes signal routing logic 24 to route the CS0 and CS1 signals to ATA device group 48B. Other signals (e.g., the master/slave select bit 4 of the drive/head command block register) may be used to select the selected ATA device from among the ATA devices of ATA device group 48B. In any case, the CS0 and CS1 signals received by the other ATA device groups 48A and 48C are deasserted as described above.

It is noted that ATA interface 44 and ATA adapter 46 of FIG. 3 are preferably combined to form a single ATA host adapter such as ATA host adapter 16 of FIG. 1. However, ATA adapter 46 may be a separate device coupled to a conventional ATA interface device, or the functionality of ATA adapter 46 may be integrated into an ATA interface device.

Figure 4:
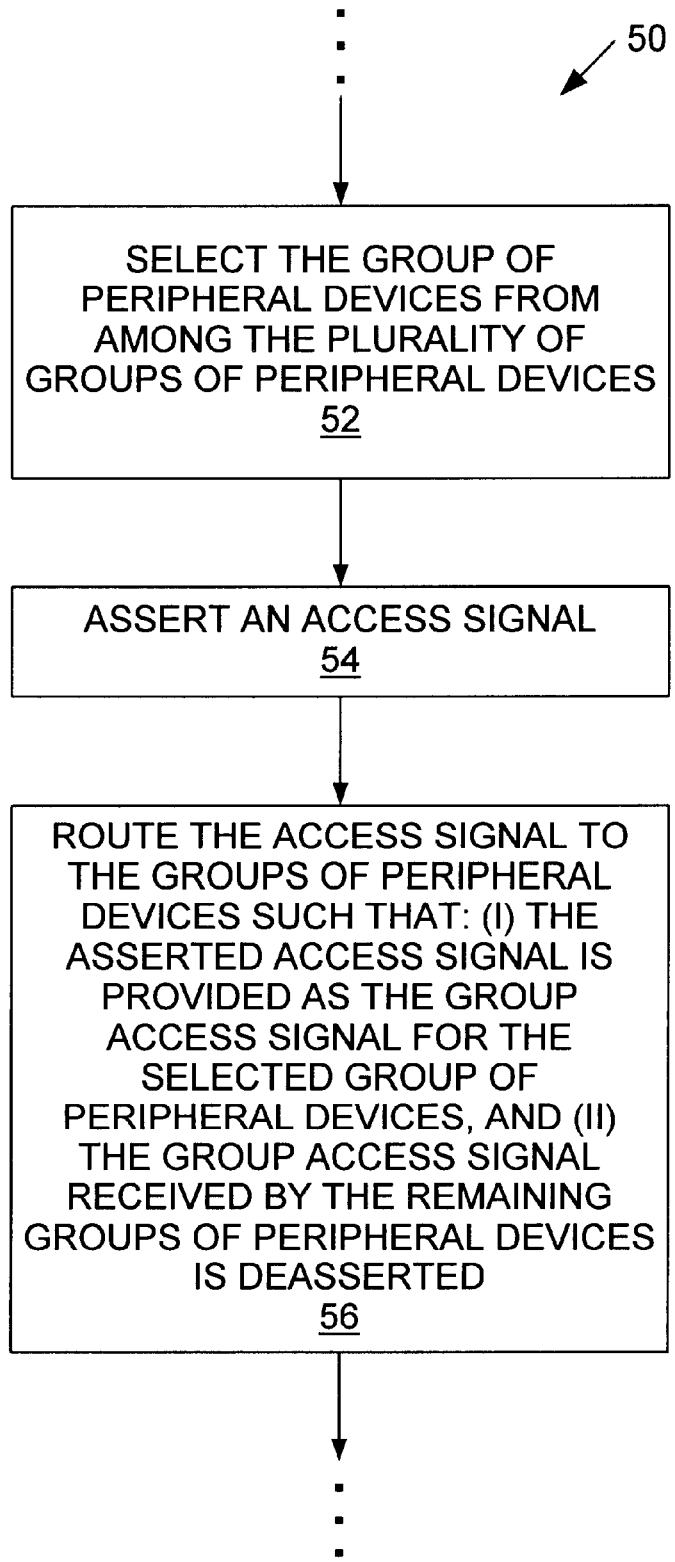
FIG. 4 is a flow chart of one embodiment of a method for accessing a group of peripheral devices, wherein the group of is one of multiple groups of peripheral devices.

FIG. 4 is a flow chart of one embodiment of a method 50 for accessing a group of peripheral devices. The group of peripheral devices is one of multiple groups of peripheral devices, and each group of peripheral devices includes at least one peripheral device. Each group of peripheral devices receives a different group access signal for controlling access to the peripheral devices of the group.

During a step 52 of method 50, a group of peripheral devices is selected from among the multiple groups of peripheral devices. The selecting may include, for example, storing a value in a control register, wherein the value stored in the control register selects the group of peripheral devices from among the multiple groups of peripheral devices. During a step 54, an access signal is asserted. The access signal is routed to the groups of peripheral devices during a step 56 such that: (i) the asserted access signal is provided as the group access signal for the selected group of peripheral devices, and (ii) the group access signal received by the remaining groups of peripheral devices is deasserted. The routing may include, for example, routing the access signal to the group of peripheral devices selected by the value stored in the control register.

In an ATA embodiment of method 50 a group of ATA devices may be accessed, wherein the group of ATA devices is one of multiple groups of ATA devices. Each group may be a single ATA device or an ATA master/slave pair. During step 52, a value may be stored in a control register for selecting the group of ATA devices from among the multiple groups of ATA devices. During step 54, an ATA standard chip select 0 (CS0) signal and an ATA standard chip select 1 (CS1) signal may be generated such that either the CS0 signal or the CS1 signal is asserted. The CS0 and CS1 signals generated during step 54 may be routed to the ATA devices during step 56. The routing may be accomplished dependent upon the value stored in the control register such that the generated CS0 and CS1 signals are provided to the ATA devices of the group selected by the value. The ATA devices of groups not selected by said value receive deasserted CS0 and CS1 signals such that the ATA devices of the non-selected groups do not respond to ATA accesses.

Numerous variations and modifications will become apparent to those skilled in the art once the above disclosure is fully appreciated. For example, embodiments other than for ATA devices are contemplated. It is intended that the following claims be interpreted to embrace all such variations and modifications.

What is claimed is:

1. A system, comprising:
   a host system;
   a plurality of groups of peripheral devices, wherein each group of peripheral devices includes at least one peripheral device, and wherein each group of peripheral devices is configured to receive a group access signal for controlling accesses from the host system to the peripheral devices; and
   a host adapter configured for coupling the host system to the plurality of groups of peripheral devices, the host adapter comprising:
      a control register for storing a value for selecting one of the groups of peripheral devices; and
      signal routing logic coupled to the control register and to each of the groups of peripheral devices, wherein the signal routing logic is coupled to receive an access signal from the host system and route the access signal to the group access signal for the group of peripheral devices selected by the value stored in the control register, and wherein the group access signal for each of the remaining groups of peripheral devices is deasserted so that the groups of peripheral devices not selected by the value stored in the control register do not respond to accesses from the host system.

2. The system as recited in claim 1, wherein each of the peripheral devices is an AT Attachment (ATA) device, and wherein the access signal is an ATA chip select or control signal.

3. The system as recited in claim 2, wherein each of the peripheral devices includes a plurality of registers, and wherein the group access signal is used to select a portion of the registers of the peripheral devices of the selected group.

4. The system as recited in claim 3, wherein the group access signal is asserted in order to select the portion of the registers.

5. The system as recited in claim 1, wherein each group of peripheral devices is connected to a common data bus.

6. The system as recited in claim 5, wherein the common data bus is an AT Attachment (ATA) data bus.

7. The system as recited in claim 1, wherein the plurality of groups is arranged in p groups, and wherein the signal routing logic comprises a 1-to-p demultiplexer coupled to the control register and configured to route the access signal from the host system to the selected group dependent upon the value stored in the control register.

8. The system of claim 1, wherein the host system comprises a central processing unit (CPU), and wherein the CPU is configured to write the value to the control register.

9. A host adapter for interfacing a host system to a plurality of groups of peripheral devices, wherein each group of peripheral devices includes at least one peripheral device, and wherein each group of peripheral devices is configured to receive a group access signal for controlling accesses from the host system to the peripheral devices, the host adapter comprising:

a control register for storing a value for selecting one of the groups of peripheral devices; and signal routing logic coupled to the control register and to each of the groups of peripheral devices, wherein the signal routing logic is coupled to provide the group access signal to the group of peripheral devices selected by the value stored in the control register, and wherein the group access signal for each of the remaining groups of peripheral devices is deasserted so that the groups of peripheral devices not selected by the value stored in the control register do not respond to accesses from the host system.

10. The host adapter as recited in claim 9, wherein each peripheral device is an AT Attachment (ATA) device, and wherein the group access signal is an ATA chip select or control signal.

11. The host adapter as recited in claim 9, wherein the plurality of groups is arranged in p groups, and wherein the signal routing logic comprises a 1-to-p demultiplexer coupled to the control register and configured to route an access signal from the host to the selected group dependent upon the value stored in the control register.

12. An AT Attachment (ATA) host adapter for interfacing a host system to a plurality of groups of ATA devices, wherein each group of ATA devices includes at least one ATA device, and wherein each group of ATA devices is configured to receive an ATA chip select 0 (CS0) signal and an ATA chip select 1 (CS1) signal for controlling accesses from the host system to the ATA devices according to an ATA standard, the ATA host adapter comprising:

a control register for storing a value for selecting one of the groups of ATA devices; and signal routing logic coupled to the control register and to each of the groups of ATA devices, wherein the signal routing logic is coupled to provide the CS0 signal and CS1 signal to the group of ATA devices selected by the value stored in the control register, and wherein the CS0 signal and CS1 signal for each of the remaining groups of ATA devices are deasserted so that the groups of ATA devices not selected by the value stored in the control register do not respond to accesses from the host system.

13. The ATA host adapter as recited in claim 12, wherein each ATA device comprises either a hard disk drive, a CD-ROM drive, a tape drive, or a DVD drive.

14. The ATA host adapter as recited in claim 12, wherein each of the ATA devices includes a plurality of registers, and wherein the registers of each ATA device are partitioned to form a control portion and a command portion, and wherein the CS0 signal is asserted in order to select the control portion, and wherein the CS1 signal is asserted in order to select the command portion.

15. The ATA host adapter as recited in claim 12, wherein all of the ATA devices are connected to a common ATA bus which is not used to convey the CS0 and CS1 signals.

16. The ATA host adapter as recited in claim 12, wherein the groups of ATA devices are arranged to form p groups, and wherein the signal routing logic comprises:

a first 1-to-p demultiplexer coupled to the control register and configured to route the CS0 signal to the ATA devices of the group selected by the value stored in the control register; and a second 1-to-p demultiplexer coupled to the control register and configured to route the CS1 signal to the ATA devices of the group selected by the value stored in the control register.

17. A method for accessing a group of peripheral devices, wherein the group is one of a plurality of groups of peripheral devices, and wherein each group includes at least one peripheral device, and wherein each group is configured to receive a different group access signal for controlling access to the group, the method comprising:

selecting the group of peripheral devices from among the plurality of groups of peripheral devices;

asserting an access signal;

routing the access signal to the groups of peripheral devices such that: (i) the asserted access signal is provided as the group access signal for the selected group of peripheral devices, and (ii) the group access signal received by the remaining groups of peripheral devices is deasserted;

wherein a value stored in a control register selects the group of peripheral devices from among the plurality of groups of peripheral devices; and wherein the routing comprises routing the access signal to the group of peripheral devices selected by the value stored in the control register.

18. A method for accessing a group of AT Attachment (ATA) devices, wherein the group is one of a plurality of groups of ATA devices, wherein each group includes at least one ATA device, the method comprising:

storing a value in a control register for selecting the group of ATA devices from among the plurality of groups of ATA devices;

generating an ATA standard chip select 0 (CS0) signal and an ATA standard chip select 1 (CS1) signal such that either the CS0 signal or the CS1 signal is asserted;

routing the CS0 and CS1 signals from said generating to the ATA devices dependent upon the value stored in the control register such that the generated CS0 and CS1 signals are provided to the ATA devices of the group selected by said value, and wherein the ATA devices of groups not selected by said value receive deasserted CS0 and CS1 signals such that ATA devices of the groups not selected by said value do not respond to ATA accesses.

* * * * *